US012595406B2

(12) United States Patent
Holt

(10) Patent No.: US 12,595,406 B2
(45) Date of Patent: ***Apr. 7, 2026

(54) LIQUID CHLORIDE SALT-BASED POLYMER SUSPENSION FLUIDS WITH POLYETHYLENE GLYCOL DISPERSANTS AND APPLICATION TO DRAG REDUCTION

(71) Applicant: PSMG, LLC, Milton, GA (US)

(72) Inventor: Jason K. Holt, Ball Ground, GA (US)

(73) Assignee: PSMG, LLC, Milton, GA (US)

( * ) Notice: Subject to any disclaimer, the term of this patent is extended or adjusted under 35 U.S.C. 154(b) by 582 days.

This patent is subject to a terminal disclaimer.

(21) Appl. No.: 17/965,239

(22) Filed: Oct. 13, 2022

(65) Prior Publication Data

US 2023/0130401 A1 Apr. 27, 2023

Related U.S. Application Data

(63) Continuation-in-part of application No. 17/733,175, filed on Apr. 29, 2022, now Pat. No. 12,227,643.

(60) Provisional application No. 63/270,856, filed on Oct. 22, 2021.

(51) Int. Cl.
| | |
|---|---|
| *C09K 8/60* | (2006.01) |
| *C08J 3/00* | (2006.01) |
| *C08J 3/05* | (2006.01) |
| *E21B 43/26* | (2006.01) |

(52) U.S. Cl.
CPC ............... *C09K 8/604* (2013.01); *C08J 3/005* (2013.01); *C08J 3/05* (2013.01); *C08J 2333/26* (2013.01); *C08J 2371/02* (2013.01); *C09K 2208/28* (2013.01); *E21B 43/26* (2013.01)

(58) Field of Classification Search
CPC .... C08J 3/005; C08J 2371/02; C08J 2471/02; C08J 3/05
See application file for complete search history.

(56) References Cited

U.S. PATENT DOCUMENTS 9,908,976 B2 3/2018 Holt

OTHER PUBLICATIONS

U.S. Appl. No. 17/733,175, filed Apr. 29, 2022.

*Primary Examiner* — Catherine S Branch
*Assistant Examiner* — Huihong Qiao
(74) *Attorney, Agent, or Firm* — Christensen, Fonder, Dardi & Busse PLLC; Peter S. Dardi; Elizabeth A. Gallo

(57) ABSTRACT

Aqueous suspensions are presented that are stable against settling without additional mixing in which the suspensions comprise a water soluble polymer that is anionic or nonionic comprising a blend of water with at least about 32 wt % chloride salt with a counter ion $A^{+a}$ with $2 \leq a$, from about 1 wt % to about 10 wt % particulate polyethylene glycol having an average molecular weight from about 1600 g/mol to about 50,000 g/mol, and from about 10 wt % to about 50 wt % of the water soluble polymer that is not a polyether. The suspensions have chlorides in a sufficient amount to inhibit hydration of the suspended water soluble polymer and the particulate polyethylene glycol. The aqueous suspension can be formed by adding a powder of polyethylene glycol to a high salt solution and then adding the high molecular weight polymer. The aqueous suspensions can be useful as friction reducing agents in flowing liquids, such as for hydraulic fracture.

18 Claims, No Drawings

LIQUID CHLORIDE SALT-BASED POLYMER SUSPENSION FLUIDS WITH POLYETHYLENE GLYCOL DISPERSANTS AND APPLICATION TO DRAG REDUCTION

CROSS REFERENCE TO RELATED APPLICATIONS

This application is a continuation-in-part of U.S. patent application Ser. No. 17/733,175, filed Apr. 29, 2022 to Holt, entitled "Liquid Chloride Salt-Based Polymer Suspension Fluids With Polyethylene Glycol Dispersants and Application to Drag Reduction" which claims the benefit of U.S. Provisional Application No. 63/270,856, filed Oct. 22, 2021 to Holt, both of which are incorporated herein by reference.

FIELD OF THE INVENTION

The invention relates to stable suspensions of water soluble or swellable polymers within a salt based carrier liquid, such as calcium chloride.

BACKGROUND OF THE INVENTION

Water soluble polymers such as polyacrylamide are typically available as powders, emulsions or suspensions. The suspension type are typically suspended within a non-hydrating fluid, such as mineral oil. The suspension versions are widely used in the oil industry as a friction reducer for fracking operations. Alternative carrier fluids can offer lower cost and better polymer hydration to that of the described oil based carrier fluids. Carrier fluids generally have the following characteristics to be considered effective:

The carrier fluid prevents the suspended polymer from excessive settling to the bottom of tanks, totes or drums. Excessive settling can result in the polymer compacting and resisting the ability to become re-suspended with induced mixing/agitation.

The carrier fluid does not hydrate the suspended polymer as this could result in solidification of the suspension.

The carrier fluid should not inhibit the suspended polymers ability to hydrate when introduced into a water dilution step of the intended application.

SUMMARY OF THE INVENTION

In a first aspect, the invention pertains to a dispersion comprising a salt based carrier fluid and a stably suspended anionic polyacrylamide wherein the said polyacrylamide does not hydrate and will remain suspended within the salt based carrier fluid.

In a further aspect, the invention pertains to a method for forming a stable suspension of water swelling superabsorbent such a sodium polyacrylate polymer.

In some aspects, the invention pertains to a method for forming an aqueous suspension of a water soluble polymer that is anionic or non-ionic. The method includes melting polyethylene glycol powder to form melted polyethylene glycol; adding the melted polyethylene glycol to a solution of a chloride salt in water to form a polyethylene glycol salt suspension; and blending a water soluble polymer with the polyethylene glycol salt suspension to form an aqueous suspension of the water soluble polymer. The water soluble polymer is anionic or non-ionic and may not be a polyether. The chloride salt may inhibit hydration of the water soluble polymer and the melted polyethylene glycol. The temperature of the solution of chloride salt in water may be at ambient temperature, below ambient temperature, or above ambient temperature. The temperature of the solution of chloride salt in water may be above ambient temperature due to heat released by the process of dissolving the chloride salt.

In some aspects, the invention pertains to an aqueous suspension of a water soluble polymer that is anionic or non-ionic comprising a blend of water with at least about 32 weight percent (wt %) chloride salt with a counter ion $A^{+a}$ with $2 \leq a$, from about 1 wt % to about 10 wt % particulate polyethylene glycol (PEG) having an average molecular weight from about 1600 g/mol to about 50,000 g/mol, and from about 10 wt % to about 50 wt % of the water soluble polymer that is not a polyether, wherein the suspension fluid contains chlorides in a sufficient amount to inhibit hydration of the suspended water soluble polymer and the particulate polyethylene glycol.

In additional aspects, the invention pertains to methods of forming the aqueous suspensions. In some embodiments, the method comprises adding particulate PEG to a solution of chloride salt in water to form a PEG salt suspension; and blending the water soluble polymer to the PEG salt suspension to form the aqueous suspension wherein the calcium chloride inhibits hydration of the polymers. The invention may pertain to the use of the aqueous suspensions as friction reducing agents for liquid flow, such as for hydraulic fracture.

DETAILED DESCRIPTION

Suspension formulates as described herein are able to achieve desired properties for use as a friction reducing agent while exhibiting a more desirable environmental footprint and at a low cost. Various salt based liquids, such as calcium chloride liquids, can contain enough chlorides to inhibit the hydration of water soluble or swelling polymers. Suspended polymers can be valuable as flow aids such that it is desirable to provide stable suspensions as process aids. It has been discovered that aqueous suspensions can be stabilized through the co-suspension of lower molecular weight PEG powders in the salt solutions. The use of aqueous solutions as flow aids provides a more ecological and lower cost alternative to mineral oil products. The use of the PEG powders allows for the formation of stable suspensions without further mixing or the addition of a polymer thickening agent, such as cellulose polymers. To achieve the desired properties, the salt levels should be high, and an appropriate amount of polymers should be present. The suspensions are suitable for large commercial scale.

These chloride liquids are relatively inexpensive when compared to that of mineral oil suspension fluids. Various attempts to suspend polymers such as polyacrylamide were attempted within standard calcium chloride liquid (roughly 38% calcium chloride). The polyacrylamide polymers did not hydrate but ultimately settled to the bottom of the sample containers and compressed to a state that would not be acceptable for end use applications. Additional attempts to increase the viscosity the calcium chloride with pre-hydrated polyacrylamide also failed to adequately suspend the particulate polyacrylamide. Surprisingly, the addition of PEG powders formed stable suspensions of high molecular weight water soluble polymers without hydrating the high molecular polymers and allowing them to remain stably suspended for suitable time for their use without additional mixing.

In principle, various simple salts can provide the ionic strengths to function in the described compositions. It has been found that polyvalent cations are particularly effective. With respect to the anions, even though other halide anions could be effective, chlorides are more environmentally desirable. Calcium chloride is a desirable salt, and magnesium chloride is a potential alternative, which both have +2 charges and are available in bulk commercial quantities. Other +2 cations would generally be effective but may be cost prohibitive. Blends of salts, such as blends of calcium chloride and magnesium chloride, can be used. The salts are generally provided in hydrated forms, for example, the hexahydrates. The solutions have high salt levels. Generally, the salt concentrations, not including the polymers, can be from about 30 wt % to about 55 wt % and in further embodiments from about 32 wt % to about 50 wt % and in other embodiments from about 35 wt % to about 46 wt %. A person of ordinary skill in the art will recognize that additional ranges of salt concentrations within the explicit ranges above are contemplated and are within the present disclosure. Calcium chloride commercial grade, and in some instances high concentration aqueous solutions, are available from Dow Chemical, Occidental Chemical, and Tetra Technologies, Inc. Magnesium chloride is available in bag of powder at commercial scales and corresponding costs.

Another common polymer known as polyethylene glycol (PEG) is a water soluble polymer and is available in liquid or powder form. PEG is a polyether with alcohol end groups, $H(O-CH_2CH_2-)_nOH$, where the value of n and its distribution determine the molecular weight and distribution of molecular weights. Generally, PEG is available over a huge molecular weight range, from a dimer to 10 million g/mole or more, although from a practical perspective, commercially available molecular weights tend to be grouped by commercial use. Higher molecular weight PEGs tend to be referred to by the equivalent name of polyethylene oxide (PEO). The liquid PEG polymers, with average molecular weights up to roughly 800 g/mole, can be viscous. PEG liquid was applied to the calcium chloride liquid in an attempt to increase the viscosity of the calcium chloride and produce beneficial suspending characteristics, but failed in doing so during tests. Higher molecular weight PEGs are solids at room temperature. PEG products generally have a distribution of molecular weights that may depend on the specific product. PEGs can be available from various suppliers, such as DuPont and BASF.

In subsequent testing, powder PEG was applied to the calcium chloride to see if the fine polymer particles would aid in the suspending of the polyacrylamide. It was noticed that the PEG powder had a tendency to float on the surface of the calcium chloride liquid. The PEG powder was mixed with a high speed mixer while the polyacrylamide powder was also added. The uniform mixture of PEG & polyacrylamide within the calcium chloride solution resulted in a stable suspension with little or no settling of the polyacrylamide and no floating of the PEG. While not wanting to be limited by theory, it is currently believed that the shape and buoyancy of the PEG powder prevents the settling and compaction observed with standard calcium chloride solutions. An additional benefit observed with use of the PEG stabilization agent is the lowering of the freezing point/precipitation point of the slurries.

It has been found that even more stable dispersions of PEG powders can be obtained by quenching PEG particles melted in suspension such that the quenched PEG particles have a very high surface area (snowflake-like) structures with a highly branched structure. The use of high surface area PEG particles may provide for the use of a lower amount of PEG in the friction reducing suspensions. The formation of the high surface area PEG suspensions is described in U.S. Pat. No. 9,908,976 to Holt, entitled "Stable Polyethylene Glycol Particle Dispersions and Methods for Firming the Stable Dispersions," incorporated herein by reference.

Suitable ranges of PEG average molecular weights can be from about 1600 g/mol to 50,000 g/mol, in further embodiments from about 2,000 g/mol to about 25,000 g/mol and in other embodiments from about 2,500 g/mol to about 10,000 g/mol. Dow Chemical sells PEG under the Brand Carbowax™ with average molecular weights of 3350, 4000, 4600 and 8000 g/mol. Desirable PEG concentrations can be from about 1 wt % to about 10 wt %, in further embodiments from about 1.5 wt % to about 8 wt % and in additional embodiments from about 2 wt % to about 7.5 wt % relative to the total slurry weights. A person of ordinary skill in the art will recognize that additional ranges of PEG average molecular weights and PEG concentrations within the explicit ranges above are contemplated and are within the present disclosure.

The PEG powder may have an average molecular weight at least about 800 g/mol such that it is not in a liquid form. The PEG powder may have an average molecular weight from about 800 g/mol to about 50,000 g/mol, from about 1000 g/mol to about 50,000 g/mol, from about 1000 g/mol to about 8000 g/mol, from about 1600 g/mol to about 50,000 g/mol, or from about 2500 g/mol to about 20,000 g/mol.

The high molecular weight polymers for providing the desired friction reduction can be non-ionic or anionic and also is not a polyether. Anionic polyacrylamide is of particular interest. Other anionic polymers of interest include, salts of polyacrylic acid, such as sodium polyacrylate, and poly(2-acrylamido 2-methylpropane sulfonic acid), which is known as polyAMPS. The sodium salt of polyAMPS can be a suitable form. AMPS in its monomer acid form has the formula $C_7H_{13}NO_4S$. Polyacrylates would include versions of the polymers, such as sodium polymethacrylates and the like. The high molecular weight polymer generally has a molecular weight of at least about 1 million (M) g/mol, in some embodiments at least about 2M g/mol, in further embodiments at least about 5M g/mol and in some embodiments at least about 8M g/mol. The upper limit is basically set by the ability to obtain commercial polymer, which presently is on the order of 30M g/mol, depending on the particular polymer. The suspensions generally have concentrations from about 10 wt % to about 50 wt %, in some embodiments from about 15 wt % to about 45 wt %, and in further embodiments from about 20 wt % to about 40 wt % polyacrylamide or other high molecular weight polymer, and these are effective concentrations to produce stable slurry/suspensions. A person of ordinary skill in the art will recognize that additional ranges within the explicit ranges above are contemplated and are within the present disclosure.

Polyacrylamide is represented by the formula $-(CH_2CH(CONH_2))_n-$, which is an amide form of polyacrylic acid. Copolymers of acrylamide can be similarly referred to as an acrylamide, and various copolymers introduce an ionic character into the polymer. For example, some polyacrylamides are copolymers of acrylamide and acrylic acid. Thus, a polyacrylamide can be non-ionic, anionic, cationic or amphoteric, and generally these various forms of polyacrylamide are suitable for forming the synergistically improved flocculant compositions. Charged polyacrylamides can be designed with varying amounts of copolymers constituents to vary the amount of charge, e.g., with charged monomers generally varying from about 10 to about 50 percent of the polymer chain. In general, anionic polyacrylamides have found use in the waste stream treatment process as flocculants, as well as in slurries for friction reduction. The molecular weight of the polyacrylamide may be a significant aspect with respect to polymer properties. In particular, it is generally desirable for the polyacrylamide to have a high average molecular weight. Generally, the polyacrylamide has an average molecular weight of at least about 16 million g/mol, in further embodiments at least about 18 million g/mol, and in further embodiments at least about 19 million g/mol, and particularly improved results have been discovered for polyacrylamides with an average molecular weight of at least 22 million g/mol, and in further embodiments at least about 22.5 million g/mol. A person of ordinary skill in the art will recognize that additional ranges of molecular weights within the explicit ranges above are contemplated and are within the present disclosure. Suitable high molecular weight polyacrylamides are available commercially, for example, from Kemira™ (e.g., 130 A 18-20M mw), SNF Floeger™ (e.g., 934 VHM 20-22M mw) and Hengyi Polymers (Hengflox™).

The slurries can be useful in particular for facilitating flow, such as in relation to petroleum fracing processes (hydraulic fracture). Reducing flow drag/friction reduces the amount of energy needed for the pumping process and/or increases flow rate. The amount of polymer added can be dependent on the desired flow characteristics, such as flow rates, pipe dimensions, pipe characteristics and the like. In hydraulic fracturing, fluid is driven at high flow rates and high pressures. Friction reduction is highly desirable to improve the process. The polyacrylamide can be used in concentrations from 100 ppm to 5000 ppm in the drilling fluids. Flow aids can also be useful in high pressure water cutting systems and the like.

For forming the slurry, the high salt water solution is formed first to prevent hydration of the polymers. The solution can be obtained commercially or formed from commercial grade water and bags of the salt. Generally, the added salt is a hydrated dry form so that excessive heating does not take place when the salt is added. Even if the hydrated salts are used, the dissolving process is exothermic so heat is given off during the dissolving process. If it is desirable to melt the PEG to form high surface area PEG particles, this may be possible without adding any heat due to the heating during the dissolving process. Thus, in some embodiments, it can be desirable to add the PEG and suspend the PEG particles prior to adding the high molecular weight polymer. The slurry can be mixed using any suitable commercial mixing apparatus. The blended slurry can be placed in drums or other large containers for commercial distribution or directed for use. The blended slurries remain stable without settling even though not subject to periodic or continuous additional mixing for a reasonable period of time allowing their use. The suspensions can be prepared without any significant amount of additional polymer thickeners.

The aqueous suspension or slurry may be formed by melting the PEG powder before adding to the aqueous solution of chloride salt. The PEG powder may be partially or completely melted before adding to the aqueous solution of chloride salt. The resulting PEG salt suspension and water soluble polymer are then blended such that an aqueous suspension of the water soluble polymer is formed. The presence of the chloride salt inhibits hydration of the water soluble polymer and the melted PEG. The aqueous solution of chloride salt may be at a particular temperature, or within a range of temperatures. For example, the solution may be at about ambient temperature (about 25° C.), or the temperature may be below ambient temperature, or not above ambient temperature. The aqueous solution of the chloride salt may be above ambient temperature. If it is desirable for the aqueous solution of the chloride salt to be at a temperature above ambient temperature, heat may or may not be provided by some external source. An external source of heat may not be necessary if the dissolving process of the chloride salt in water provides a sufficient amount of heat.

If the PEG powder is melted before adding to the aqueous solution of the chloride salt, the melted PEG may or may not resolidify upon adding to the aqueous solution of the chloride salt, or upon blending with the water soluble polymer. If the melted PEG resolidifies, particles of PEG may form which may or may not be smaller than those of the PEG powder. The PEG does not dissolve due to the high salt concentrations. The chloride anions may prevent dissolution of PEG such that resolidification of the PEG into the particles is facilitated by the presence of the chloride anions. The particles formed by resolidification of melted PEG may have complex morphologies as described, for example, in the above-referenced U.S. patent '976 to Holt.

EXAMPLES

Calcium Chloride/PEG/PAM Slurries

This example demonstrated the effectiveness of slurry stabilization with a high molecular weight anionic polyacrylamide polymer.

The calcium chloride and PEG 3350 were obtained from DOW Chemical. and anionic polyacrylamide was obtained from SNF (France). For testing 400 g samples were prepared. The following Table presents results for various samples with the balance for each sample being water.

TABLE

| PERCENT CALCIUM CHLORIDE | PEG PERCENT | POLY- ACRYLAMIDE PERCENT | RESULTS | COMMENT |
|---|---|---|---|---|
| 32 | 4 | 17 | FAIL | SOLIDIFIED |
| 34 | 4 | 17 | FAIL | SOLIDIFIED |
| 35 | 4 | 17 | FAIL | SOLIDIFIED |
| 36 | 4 | 17 | PASS | VERY GOOD |
| 36 | 4 | 34 | PASS | VERY GOOD |
| 36 | 4 | 34 | PASS | VERY GOOD |
| 37 | 4 | 17 | PASS | BEST |
| 37 | 4 | 17 | PASS | BEST |
| 37 | 4 | 34 | PASS | VERY GOOD |

TABLE-continued

| PERCENT CALCIUM CHLORIDE | PEG PERCENT | POLY- ACRYLAMIDE PERCENT | RESULTS | COMMENT |
|---|---|---|---|---|
| 38 | 4 | 17 | PASS* | *FLOATS BUT CAN BE CORRECTED WITH AGITATION |
| 38 | 4 | 17 | PASS* | *FLOATS BUT CAN BE CORRECTED WITH AGITATION |
| 38 | 4 | 34 | PASS* | *FLOATS BUT CAN BE CORRECTED WITH AGITATION |

The boundaries of acceptable parameters depends on the specifics of the polyacrylamide and can be expected to depend on other parameters for modest degrees as well as temperature.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated. The use of the term "about" herein refers to the understanding of a person of ordinary skill in the art in the particular context, which may involve measurement error and/or reporting precision as would be understood by a person of ordinary skill in the art in the context for the particular parameter unless explicitly indicated otherwise.

What is claimed is:

1. A method for forming an aqueous suspension of a water soluble polymer that is anionic or non-ionic comprising:
melting polyethylene glycol powder to form melted polyethylene glycol;
adding the melted polyethylene glycol to a solution of a chloride salt in water to form a polyethylene glycol salt suspension; and
blending a water soluble polymer with the polyethylene glycol salt suspension to form an aqueous suspension of the water soluble polymer, wherein the water soluble polymer is anionic or non-ionic and is not a polyether, and the chloride salt inhibits hydration of the water soluble polymer and the melted polyethylene glycol.

2. The method of claim 1 wherein the solution of a chloride salt in water comprises at least about 32 wt % chloride salt with a counter ion $A^{+a}$ with $2 \le a$.

3. The method of claim 2 wherein the chloride salt comprises calcium chloride.

4. The method of claim 2 wherein the chloride salt comprises magnesium chloride.

5. The method of claim 1 wherein the aqueous suspension of the water soluble polymer comprises from about 10 wt % to about 50 wt % of the water soluble polymer.

6. The method of claim 1 wherein the water soluble polymer is anionic polyacrylamide having an average molecular weight of at least about 10M g/mol.

7. The method of claim 1 wherein the water soluble polymer is a salt form of poly(2-acrylamido 2-methylpropane sulfonic acid).

8. The method of claim 1 wherein the polyethylene glycol powder has an average molecular weight from about 800 g/mol to about 50,000 g/mol.

9. The method of claim 1 wherein the polyethylene glycol powder has an average molecular weight between 1000 and 8000 g/mol.

10. The method of claim 1 wherein the polyethylene glycol powder has a molecular weight from about 2500 g/mol to about 20,000 g/mol.

11. The method of claim 1 wherein the polyethylene glycol powder has a high surface area corresponding to a highly branched structure.

12. The method of claim 1 wherein the water soluble polymer remains stably suspended without periodic or continuous mixing.

13. The method of claim 1 wherein the aqueous suspension is substantially free of polymer thickeners.

14. The method of claim 1 wherein the temperature of the solution of chloride salt in water is not above ambient temperature.

15. The method of claim 1 wherein the temperature of the solution of chloride salt in water is above ambient temperature.

16. The method of claim 15 wherein the temperature of the solution of chloride salt in water is above ambient temperature due to heat released by the process of dissolving the chloride salt.

17. A method for reducing friction of a viscous liquid flowing in a pipe, the method comprising adding the aqueous suspension of claim 1 in a sufficient amount to improve flow.

18. The method of claim 17 wherein the flow is directed to hydraulic fracture of rock.

* * * * *